United States Patent [19]
Noorily

[11] 3,942,750
[45] Mar. 9, 1976

[54] ADJUSTABLE CLAMP

[75] Inventor: Peter Noorily, Holliswood, N.Y.

[73] Assignee: Thomas & Betts Corporation, Elizabeth, N.J.

[22] Filed: Aug. 13, 1974

[21] Appl. No.: 496,978

[52] U.S. Cl. .......................... 248/74 PB; 24/16 PB
[51] Int. Cl.² ..................... F16L 3/08; B65D 67/02
[58] Field of Search.......... 24/16 PB, 30.5 P, 73 PB, 24/110, 206 A, 230 SC, 230 SL, 230 CF, 230 F, 230 B; 248/74, 231

[56] References Cited
UNITED STATES PATENTS

| 984,682 | 2/1911 | Lott | 24/230 SC |
|---|---|---|---|
| 1,236,458 | 8/1917 | McDonald | 24/230 B |
| 2,884,214 | 4/1959 | Wrobel | 248/74 PB |
| 2,915,268 | 12/1959 | Wrobel | 248/74 PB |
| 3,214,808 | 11/1965 | Litwin | 248/74 PB UX |
| 3,324,592 | 6/1967 | Prenner et al. | 24/206 A X |
| 3,748,696 | 7/1973 | Martin | 24/16 PB |
| 3,848,299 | 11/1974 | Gray | 24/230 SC |

FOREIGN PATENTS OR APPLICATIONS

| 1,124,412 | 10/1956 | France | 248/74 R |

*Primary Examiner*—Roy D. Frazier
*Assistant Examiner*—Lawrence J. Staab
*Attorney, Agent, or Firm*—David Teschner; Jesse Woldman

[57] ABSTRACT

An adjustable clamp formed preferably of suitable molded plastic resin includes a base portion having a generally elongate strap receiving chamber within which are disposed a series of teeth adapted to releasably interlock with a pawl means located at the free end of a generally elongate flexible strap of preferably uniform cross section, the other end of the strap being attached to the base portion adjacent an apertured end arranged to guide the strap into the strap receiving chamber.

8 Claims, 10 Drawing Figures

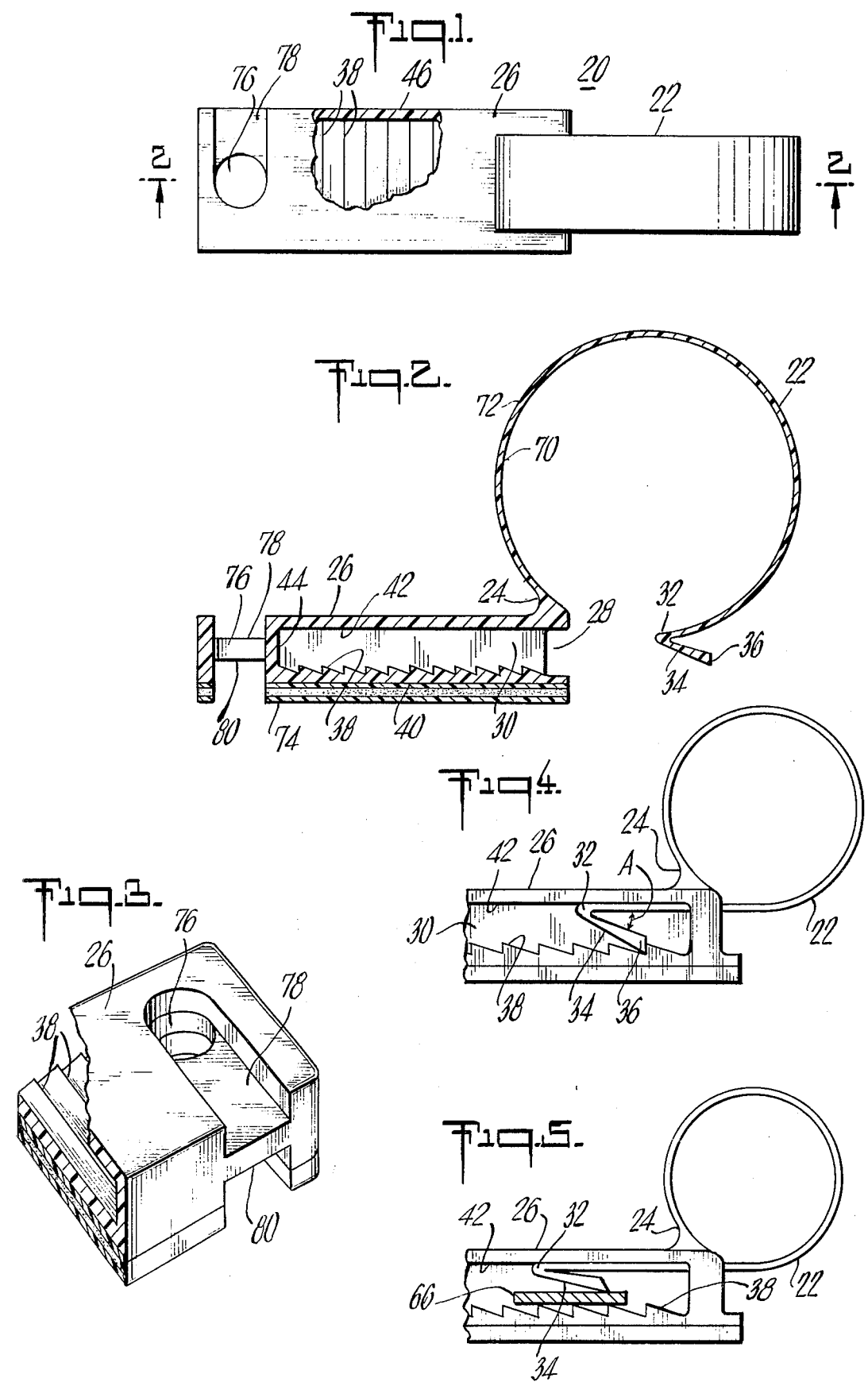

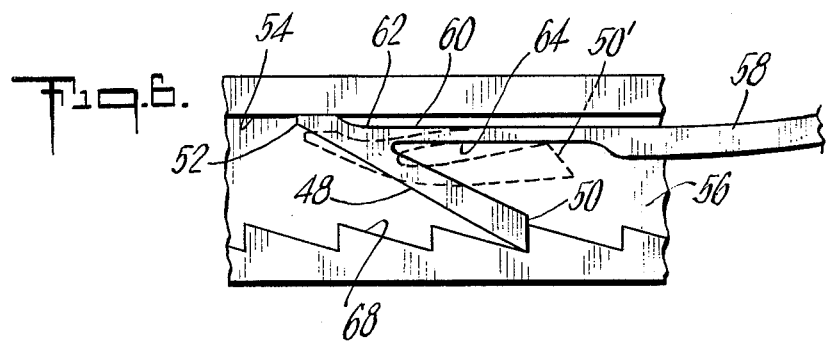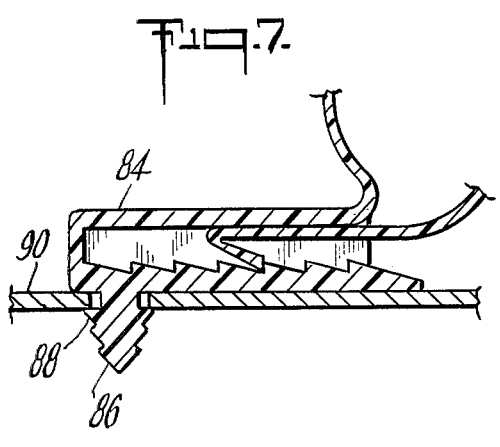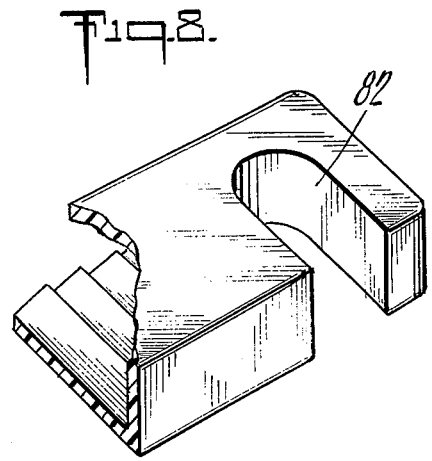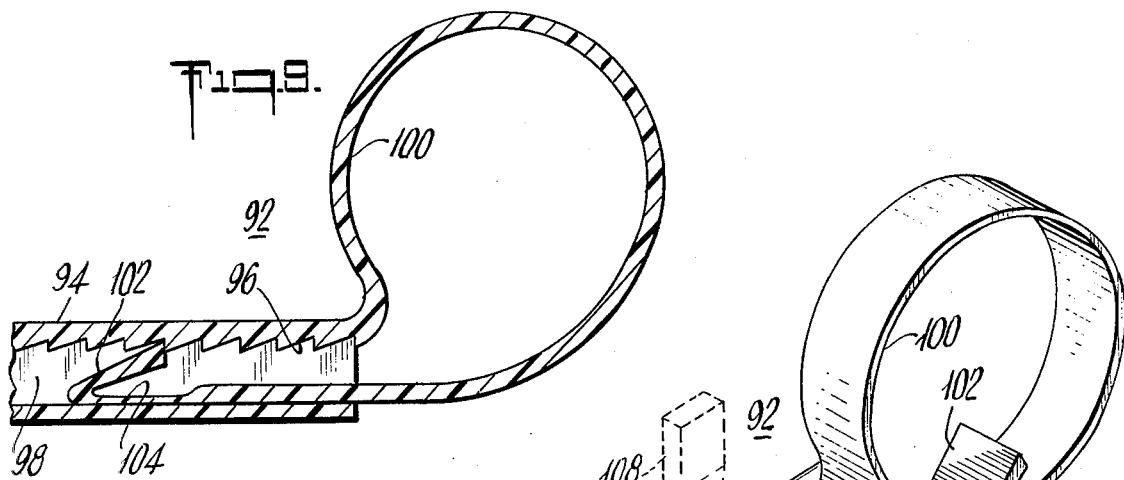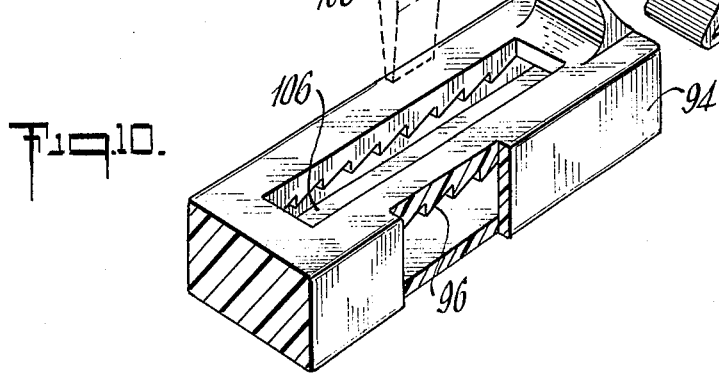

ADJUSTABLE CLAMP

BACKGROUND OF THE INVENTION

1. Field of the Invention

The invention is directed to the field of adjustable clamps for supporting elongate articles such as a bundle of wires or the like.

2. Description of the Prior Art

Various prior art adjustable clamps designed to accommodate elongate articles such as wire bundles as a harnessing aid or the like generally include an elongate strap portion in which the free end or tail portion thereof generally overlies the base portion of the clamp and is fastened thereto by means of a threaded fastener or the like to restrict movement of the wires or other tubular elements held within the looped portion of the strap. A disadvantage of such arrangement is the limited range of opening available in any given clamp size. A device designed to provide somewhat greater adjustment is disclosed in U.S. Pat. No. 3,169,005 issued to I. D. Wallach on Feb. 9, 1965. This device incorporates a free loop portion which is preformed to accommodate a bundle of wires or the like but which, however, fails to provide secure retention of the bundle due to the absence of any provision for securing the looped portion of the clamp to the base portion thereof. In U.S. Pat. No. 3,542,321, issued to R. D. Kahabka on Nov. 24, 1970, there is disclosed an adjustable tie having a flexible strap portion insertable within a relatively short, slotted bridge overhanging a central opening in the mounting member, the interior of the bridge being provided with a ratchet pawl having a lever arm extending therefrom for engagement with a series of teeth disposed along the length of the strap. The excess strap portion extending beyond the pawl is thus required to be severed from the remainder of the strap to avoid interference with adjacent components, thereby seriously limiting the effectiveness of the clamp in many applications where reuse is necessary or desirable. Furthermore, the release lever attached to the mounting member of the tie is located in a relatively exposed area and may be disadvantageously inadvertently contacted to cause premature release of the article intended to be restrained within the looped portion of the strap.

SUMMARY OF THE INVENTION

The invention overcomes the difficulties and limitations noted above with respect to prior art devices by providing a releasable adjustable clamp having a smoothly surfaced flexible strap portion terminating in a pawl means pivotally attached to the free end of the strap portion and selectively engagable with a series of transverse teeth extending longitudinally within a strap receiving chamber located within the base portion of the clamp wherein the portion of the strap which would normally be considered excess is fully contained within the base portion strap receiving chamber to provide a reusable clamp assembly which is more secure, compact, reliable, and efficient than such prior art devices. The entire assembly may be inexpensively molded as a single unitary element comprising an integral strap and base portion, wherein the strap portion may be preformed into a partial loop with the pawl means being flexibly joined to the free end of the strap portion by means of a flexible hinge portion of reduced cross sectional area arranged to provide increased flexibility thereat. The pawl means is arranged to interlock with the teeth within the strap receiving chamber of the base portion as the free end of the strap is inserted therewithin but may be readily released therefrom by providing, in one embodiment, an opening in a sidewall of the base portion to provide access to the pawl means to release same from interlocking engagement with the teeth. The clamp may be mounted to a supporting surface by the employment of either a resilient adhesive layer attached to the bottom of the base portion or by the employment of a suitable aperture or slot located remote from the strap receiving chamber and arranged to receive a fastener cooperatively engagable with the base portion and the supporting structure. Accordingly, the strap may be repeatedly engaged with and disengaged from the base portion either prior or subsequent to the attachment of the clamp to a supporting surface. The releasable feature also adds to the versatility of the device by permitting the clamp to be repeatedly closed and reopened about, for example, a bundle of wires to provide a harnessing aid for use in conjunction with a harness board or the like. It is therefore an object of this invention to provide an improved adjustable clamp.

It is another object of this invention to provide an adjustable clamp for wire bundles or the like incorporating a receiving chamber to encompass the excess strap portion extending beyond the locking means of the clamp.

It is a further object of this invention to provide an improved adjustable clamp having a releasable pawl means.

It is yet another object of this invention to provide an improved adjustable clamp of unitary construction which may be inexpensively molded from plastic material for use as an harnessing aid or the like.

It is still another object of this invention to provide a reuseable adjustable clamp attachable to a supporting surface either prior or subsequent to locking interengagement between the strap and base portion thereof.

It is yet a further object of this invention to provide a means for attaching a bundle of wires or the like to a supporting surface either temporarily or permanently in an assembly which may be formed as a single integral unit.

Other objects and features will be pointed out in the following description and claims and illustrated in the accompanying drawings, which disclose, by way of example, the principle of the invention and the best mode contemplated for carrying it out.

BRIEF DESCRIPTION OF THE DRAWINGS

In the drawings:

FIG. 1 is a top plan view, partly cut away and partly in section, of an adjustable clamp constructed in accordance with the concepts of the invention.

FIG. 2 is a side elevational view, in section, taken along the line 2—2 of FIG. 1.

FIG. 3 is a fragmentary perspective view, partly in section, of a portion of the device of FIG. 1.

FIG. 4 is a fragmentary side elevational view, illustrating the manner in which closure of the device of FIG. 1 is effected.

FIG. 5 is a fragmentary side elevational view similar to FIG. 4 but illustrating a manner of disengaging the device of FIG. 1.

FIG. 6 is an enlarged fragmentary side elevational view of a further embodiment of a pawl means of an adjustable clamp constructed in accordance with the concepts of the invention.

FIG. 7 is a fragmentary side elevational view, in section, showing a further embodiment of a mounting means of an adjustable clamp constructed in accordance with the concepts of the invention.

FIG. 8 is a fragmentary perspective view, partly in section, showing a further embodiment of a mounting means of an adjustable clamp constructed in accordance with the concepts of the invention.

FIG. 9 is a fragmentary side elevational view, in section, of a further embodiment of an adjustable clamp constructed in accordance with the concepts of the invention.

FIG. 10 is a fragmentary perspective view, partly cut away and partly in section, of the device of FIG. 9 illustrating a manner in which the strap portion may be released from the base portion thereof.

Similar elements are given similar reference characters in each of the respective drawings.

DESCRIPTION OF THE PREFERRED EMBODIMENTS

Turning now to FIGS. 1 through 5 there is shown an adjustable clamp 20 constructed in accordance with the concepts of the invention and comprising a flexible strap portion 22 having a first end 24 coupled to a base portion 26 having an entrance end 28 comprising an opening of cross sectional configuration conforming generally with the shape of the strap portion 22 and communicating with an elongate strap receiving chamber 30 extending lengthwise within the base portion 26. The strap portion 22 includes a second end 32 to which is hingedly coupled a pawl means 34 which, as illustrated in FIG. 2, may be formed integrally with the strap portion 22 in the form of a barb-like member having a terminating edge 36 selectively engagable with a series of transverse strap engaging teeth 38 extending lengthwise within the strap receiving chamber 30 along a lower interior surface 40 defining one wall of the strap receiving chamber 30. The plane of the terminating edge 36 of pawl means 34 is arranged preferably to coincide with the plane of the upstanding surface of the teeth 38 when interlocked with one another to maximize the interengagement therebetween. The strap receiving chamber 30 is further defined by an upper interior surface 42, an end wall 44, and a closed sidewall 46 (FIG. 1), the sidewall opposite the sidewall 46 being provided with an opening for access to the teeth 38 within the strap receiving chamber 30 to provide means for releasing the pawl means 34 from engagement with the teeth 38, as will be described in greater detail hereafter. The pawl means 34 although shown as a simple hook in FIG. 2 may alternatively be formed as illustrated in detail in FIG. 6 wherein there is shown a pawl means 48 having a strap engaging portion 50 and a heel portion 52, the heel portion 52 being disposed remote from the tooth engaging portion 50 and arranged to abut an upper interior surface 54 of a strap receiving chamber 56 essentially duplicative of the strap receiving chamber 30 illustrated in FIG. 2. As further shown in the embodiment illustrated in FIG. 6, the pawl means 48 is hingedly coupled to a flexible strap portion 58 by an interconnecting portion 60 communicating with the pawl means 48 generally intermediate the heel portion 52 and the tooth engaging portion 50 thereof, as at 62. The interconnecting portion 60 is further provided with a recessed portion 64 located within the path described by the pawl means 48 and arranged to at least partially accept the tooth engaging portion 50 of the pawl means 48 as the pawl means 48 is deflected towards the flexible strap portion 58 to assume a position as shown generally by the dotted outline 50'. As further illustrated by the dotted outline 50', the heel portion 52 is caused to pivot away from the upper interior surface 54 of the strap receiving chamber 56 so that the strap portion may be unobstructively withdrawn from the strap receiving chamber 56 simply by inserting a narrow flat blade such as 66, (FIG. 5) between the pawl means 48 and teeth 68 within the strap receiving chamber 56 in the manner illustrated in FIG. 5. As further illustrated in FIG. 1, the strap portion 22 and the base portion 26 are so oriented with respect to one another as to be longitudinally bisected by a common plane so that the free or second end 32 of the strap portion 22 may be conveniently and rapidly aligned with and guided directly into the strap receiving chamber 30 with a minimum of effort. The strap portion 22 may, accordingly, be looped about a bundle of wires or the like, (not shown) and the second end 32 of the strap portion 22 advanced into the strap receiving chamber 30 of the base portion 26, essentially as illustrated in FIG. 4, until a predetermined tightness is obtained whereby the strap portion 22 is now encircled about an article (not shown) disposed within the looped portion thereof with the looped portion maintained at a predetermined size as a result of the locking interengagement between the pawl means 34 and a given tooth 38 disposed within the strap receiving chamber 30. As further shown in FIG. 2, the strap portion 22 has an essentially rectangular cross section and comprises smoothly contoured opposing surfaces 70 and 72 substantially equally spaced from one another along the major length of the strap portion 22. The smooth interior surface 70 of the strap portion 22 insures that in those applications where the clamp is employed to restrain a bundle of insulated electrical wires there will be no distortion of or deformation of the wire insulation in direct contact with the inner surface 70 of the strap portion 22, as is generally the case where the strap is provided with serrations or teeth commonly employed in many prior art devices. It will also be clear from an examination of FIG. 4 that the spacing between the crest of the teeth 38 and the upper interior surface 42 of the strap receiving chamber 30 will have a direct bearing upon the angular disposition of the pawl means 34 with respect to the major axis of the strap portion 22, as indicated by the reference character A in FIG. 4. Where the clamp 20 is to be molded or formed from relatively resilient plastic material, deflection or distortion of the pawl means 34 in the locked position may be minimized by minimizing the height of the strap receiving chamber 30 relative to the thickness of the strap portion 22, to provide an angle A less than 45 degrees so that the major portion of the force vector exerted by the strap portion 22 upon the pawl means 34 in the retention position will be directed against the adjacent face of a tooth 38 and generally along the plane of the pawl means 34 with the smaller force vector component being applied in a direction generally transverse to the plane of the pawl means 34, which component, of course, will tend to bend the pawl means 34. Accordingly, thinner material than would be required in the event the angle A exceeded 45° may be employed where the height of the strap receiving chamber 30 is properly controlled to insure that the above conditions are met. As illustrated in FIG. 2, the clamp 20 is provided with alternative means for permitting it to be mounted to a supporting surface (not shown), one of such means including a resilient adhesive layer 74 affixed to the bottom side of the base portion 26 and which may contain a release paper removable from the adhesive layer 74 just prior to application of the base portion 26 to the supporting surface. Alternatively, a generally transverse aperture 76 disposed within a recessed portion 78 located adjacent the end of the base portion 26 remote from the entrance end 28 thereof, may be employed to receive the shank portion of a fastener such as a threaded screw or the like (not shown) to fasten the base portion 26 of the clamp 20 to a supporting surface. A second recessed portion 80 (FIG. 3) located on the opposite side of the recessed portion 78 may be advantageously employed to receive an upstanding rib or protrusion (not shown) located on the supporting surface to further lock the clamp 20 in a rotation of the base desired position. For convenience, the aperture 76 may be replaced by a slot 82 as shown in FIG. 8 to obviate the necessity for completely removing the clamp retaining fastener from the supporting surface when either repositioning, removing, or relocating the clamp 20. As further illustrated in FIG. 7, there is shown a clamp base portion 84 essentially similar to the base portion 26 shown in FIG. 2 but differing, however, in having mounting means in the form of a barb extension 86 depending from the underside thereof and arranged to be inserted within an aperture 88 in a supporting surface 90 to maintain the base portion 84 in position adjacent the supporting surface 90 while permitting it to be freely rotated about the extension 86. This feature may be found extremely advantageous in harness board applications where it is desired to effect repeated repositioning of the clamp during use.

Turning now to FIGS. 9 and 10 there is shown a further embodiment of an adjustable clamp 92 constructed in accordance with the concepts of the invention. In this case, there are provided a series of strap engaging teeth 96 disposed along the upper interior surface of the base portion 94 and extending downwardly into a strap receiving chamber 98 arranged to receive a flexible strap portion 100 similar to strap portion 22, but having a pawl means 102 hingedly coupled thereto at its free or second end 104 in an orientation opposite to that of the pawl means 34 to mate with the teeth 96. Otherwise, the elements 34 and 102 are essentially identical in all other respects. To permit disengagement of the pawl means 102 from the teeth 96 there is provided an opening 106 (FIG. 10) extending from the top surface of the base member 94 into the strap receiving chamber 98 to provide access to the pawl means 102, whereby a blade member or the like such as shown by the dotted outline 108 in FIG. 10 may be inserted within the opening 106 to force the pawl means 102 downwardly and away from engagement with the teeth 96 to permit the strap portion 100 disposed within the strap receiving chamber 98 to be withdrawn therefrom. It will of course be readily apparent to those skilled in the art that the opening in 106 base portion 94 may be eliminated and an opening (not shown) provided in the sidewall thereof in a manner similar to that described above with respect to the embodiment shown in FIGS. 1 through 5 whereby release of the pawl means 102 from engagement with the teeth 96 may be accomplished in a manner essentially as shown in FIG. 5. It will also be readily apparent to those skilled in the art that either of the clamps 20 or 92 described heretofore may include a non-integral construction having separate strap and base portions joined together by cementing, welding, or other like bonding processes, or may be formed as a unitary integrally molded unit from almost any suitable plastic resin material. Although not shown, each of the clamps 20 and 96 may be provided with plural strap portions extending respectively from each end of the base portion and insertable within the strap receiving chamber essentially as described heretofore to provide a multiloop clamp. In such case, however, the strap receiving chamber will be provided with two series of teeth each suitably oriented to mate with a respective pawl means.

As an alternative embodiment (not illustrated) the pawl engaging teeth may be disposed along the sidewalls of the base portion within the strap receiving chamber for engagement with suitably oriented pawl means disposed essentially perpendicular to the orientation illustrated above with respect to the embodiments described heretofore and extending outwardly from the sides of the strap portion.

The embodiments of the invention in which an exclusive property or privilege is claimed are defined as follows:

1. An adjustable clamp comprising: a generally elongate base portion for supporting said clamp adjacent a given surface, said base portion having a first end, a second end, an exterior mounting surface, and an at least partially enclosed strap receiving chamber therewithin, said chamber extending generally lengthwise between said first and said second ends within said base portion generally parallel to said exterior mounting surface and communicating with said first end of said base portion to provide an entrance end thereat, said chamber being at least partially defined by an upper interior surface, a lower interior surface, and at least one sidewall; a series of teeth selectively disposed within said strap receiving chamber on one of said upper and said lower interior surfaces; a flexible strap portion having a first end and a second end, said strap portion first end being coupled to said base portion directly adjacent said entrance end of said strap receiving chamber, said strap portion second end terminating in a pawl means arranged for selective releasable engagement with said base portion teeth within said strap receiving chamber; and means to permit the attachment of said base portion to a surface; said flexible strap portion being selectively preformed into a loop with said pawl means positioned generally adjacent said entrance end of said strap receiving chamber, said flexible strap portion thus substantially fully encircling an article inserted within said loop prior to closure and restraining the movement of such article upon the engagement of said strap portion pawl means with said base portion teeth, said strap portion being formed integrally with said base portion, said pawl means being hingedly coupled to said strap portion second end for pivotal movement thereat, said clamp being a molded assembly of unitary construction, said pawl means being joined to said strap portion second end by a connecting portion having a reduced cross section to provide increased flexibility thereat, said pawl means further including a heel portion, said heel portion being joined to said pawl means at the junction between said pawl means and said strap portion second end and extending away from said pawl means along a common plane and in a direction opposite to said pawl means and arranged to abut one of said interior surfaces of said base portion chamber remote from said interior surfaces on which said teeth are disposed to increase the locking engagement between said pawl means and said teeth.

2. An adjustable clamp as defined in claim 1 wherein said base portion has an opening along one side thereof to provide access to said base portion teeth.

3. An adjustable clamp as defined in claim 2 wherein said teeth are disposed along said base portion lower interior surface.

4. An adjustable clamp as defined in claim 1 wherein said teeth are disposed along said base portion upper interior surface.

5. An adjustable clamp as defined in claim 4, there being an elongate slot extending inwardly from the exterior surface of said base portion and communicating with said base portion upper interior surface to provide access to said base portion teeth.

6. An adjustable clamp as defined in claim 1 said strap portion having a recessed portion adjacent its second end and within the path described by said pawl means as said pawl means is pivoted towards said strap portion second end.

7. An adjustable clamp as defined in claim 1 wherein the longitudinal axis of said strap portion and the longitudinal axis of said base portion lie in a common plane.

8. An adjustable clamp as defined in claim 1 wherein said strap portion has a generally rectangular cross section of substantially uniform thickness throughout the length of said strap portion.

* * * * *